Aug. 16, 1955   J. M. MORRIS   2,715,426
HACK SAW WITH ANGULAR BLADE ADJUSTING MEANS
Filed April 15, 1954
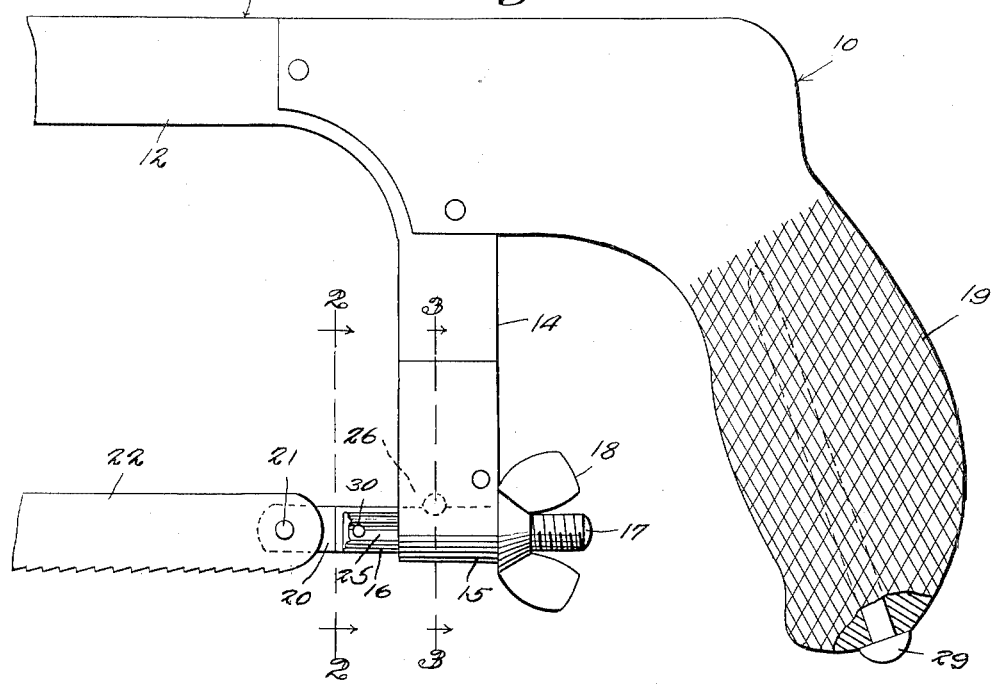
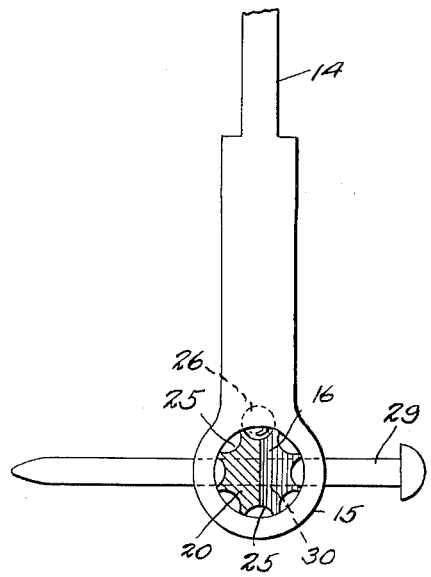
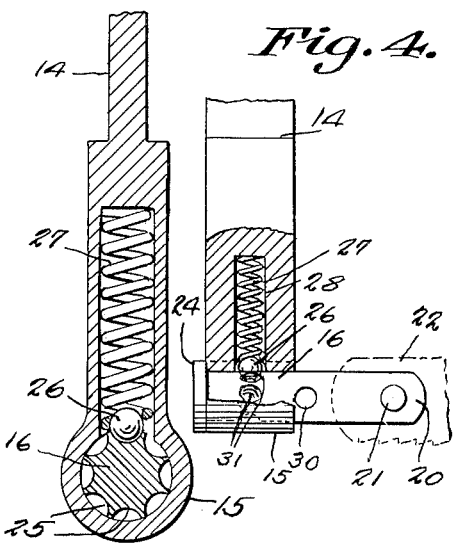
J. M. Morris
INVENTOR

United States Patent Office 2,715,426
Patented Aug. 16, 1955

2,715,426

HACK SAW WITH ANGULAR BLADE ADJUSTING MEANS

John M. Morris, Pensacola, Fla.

Application April 15, 1954, Serial No. 423,321

2 Claims. (Cl. 145—33)

This invention relates to an improved hack saw and more particularly to a spring means for holding a hack saw blade at a selected angle relative to the hack saw frame.

It is a primary object of this invention to provide an improved hack saw of the kind to be more particularly described hereinafter which may be used alone in place of many hack saws each having a saw blade in a hack saw frame for the many uses to which a hack saw may be applied.

It is another object of this invention to provide a hack saw of this kind on which a hack saw blade may be adjusted to a certain desired angle without separating the elements of the hack saw from but holding the hack saw blade firmly at its desired angle.

It is yet another object of this invention to provide an improved handle for a hack saw which may be easily and readily constructed at an economical cost to warrant the change over from an older fixed frame and blade to the frame with the rotatable blade support.

Other and further objects and advantages of the invention will be hereinafter described and the novel features thereof defined in the appended claims.

In the drawings:

Fig. 1 is a side elevation, partly broken away, of the handle end of an improved hack saw and frame therefor constructed according to an embodiment of my invention.

Fig. 2 is an enlarged detailed section taken on the line 2—2 of Fig. 1.

Fig. 3 is an enlarged detailed section taken on the line 3—3 of Fig. 1.

Fig. 4 is an enlarged detailed side elevation of the frame of my hack saw at the ends thereof removed from the handle.

Referring now more particularly to the drawings the numeral 10 designates generally an improved hack saw constructed according to an embodiment of my invention. The improved hack saw includes a hack saw frame 11 having an upper longitudinally extending bar 12 with an arm 14 fixed to and extending perpendicularly from the bar 12 at each end thereof for supporting a hack saw blade during the sawing operation of the hack saw blade.

A tube 15, hollow and open at its opposite ends is secured to the end of each arm 14 remote from the longitudinally extending bar 12 so that the axis of the tube 15 is parallel to the bar while being perpendicular to the arm 14.

A cylindrical body 16 is rotatably carried in each of the tubes 15 and one of the cylindrical bodies 16 has a screw 17 extending axially outwardly therefrom with a thumb nut 18 threadably engaged with the screw between the tube 15 and the handle 19 which is also secured to one end of the longitudinally extending frame bar 12 as clearly noted in the drawings.

A stud 20 is fixed to or formed integral with the other end of the cylindrical body 16 and a similar stud 20 is carried by the opposing cylindrical body at the other end of the hack saw frame, both of the studs 20 having a laterally extending curved pin 21 extending outwardly therefrom for engagement in a hole at an end of the saw blade 22 so that the saw blade 22 is supported on the hack saw frame substantially parallel to the longitudinally extending bar 12.

Whereas the thumb nut 18 will secure the cylindrical body 16 at one of the arms 14 against free movement therefrom a flat disc 24 is formed on the other of the cylindrical bodies 16 remote from the handle 19 to hold the other cylindrical body 16 in its proper position as the saw blade 22 is tightened by the rotative movement of the thumb nut 18 on the screw 17.

The cylindrical body 16 is fluted longitudinally therefrom with flutes 25 thereon which are disposed circumferentially spaced apart for the reception between the flutes of a detent type ball 26 which is constantly urged to its holding engagement with its respective cylindrical body by a coil spring 27 located longitudinally of the arms 14.

The cylindrical body 16 having the disc 24 remote from the handle 19 has a circumferential series of sockets 31 for receiving a spherical detent 26 to resiliently hold this latter body 16 in its rotated angular position.

The cylindrical bodies and the flutes may be rotated in the respective tubes 15 by a tool, as a tool pin 29 which may be engaged through a tool opening 30 in either the stud 20 or through the cylindrical body 16. A tool pin is preferred as the operating device for rotating the cylindrical body 16 as the tool pin 29 may be carried by the handle 19 before, during an operation of the adjustment of the cylindrical bodies 16 to provide for the support of the saw blade 22 at its desired angular relation to the hack saw frame 11 so that any other tool need not be sought when the hack saw 10 is being used.

While the specific details of one embodiment of this invention have been herein shown and described, the invention is not confined thereto as changes and alterations may be made without departing from the spirit and scope thereof as defined in the appended claims.

I claim:

1. An improved hack saw blade holding frame comprising an elongated frame bar, a laterally extending arm on each end of said bar, a handle on one end of said bar, a hollow open ended tube on each of said arms remote from and parallel to said bar, a cylindrical body rotatable in each of said tubes, longitudinally extending flutes having curved surfaces on said cylindrical body adjacent said handle, a series of ball receiving sockets on the cylindrical body remote from said handle, a saw blade attaching lug on one end of each of said cylindrical bodies, a saw blade detachably engaged with and between said lugs, a screw on one of said bodies opposite from the lug thereon, a wing nut threaded on said screw and engaging an end of its respective tube for tightening or loosening said saw blade on said frame, a circular head on the other of said bodies and a ball detent on each of said arms resiliently engaged within said flutes and in aligned sockets securing said bodies at a selected angular relation to said bar.

2. An improved hack saw blade holding frame as set forth in claim 1, wherein said cylindrical bodies have openings extending therethrough for receiving a tool for effecting rotary adjustment of said cylindrical bodies.

References Cited in the file of this patent

UNITED STATES PATENTS

| | | |
|---|---|---|
| 487,358 | Whelpley | Dec. 6, 1892 |
| 1,665,317 | Maxson | Apr. 10, 1928 |
| 1,865,026 | Loga | June 28, 1932 |
| 2,048,627 | Schmidt et al. | July 21, 1936 |
| 2,629,413 | Stettler | Feb. 24, 1953 |

FOREIGN PATENTS

| | | |
|---|---|---|
| 586,078 | Great Britain | Mar. 6, 1947 |